US009967523B2

(12) United States Patent
Ozturk et al.

(10) Patent No.: US 9,967,523 B2
(45) Date of Patent: May 8, 2018

(54) LOCATING SYSTEMS AND METHODS FOR COMPONENTS

(71) Applicant: General Electric Company, Schenectady, NY (US)

(72) Inventors: Yusuf Eren Ozturk, Istanbul (TR); Selami Haydar Icli, Istanbul (TR); Mustafa Yuvaklioglu, Gebze (TR); Bryan J. Germann, Greenville, SC (US); Jason Lee Burnside, Greenville, SC (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 14/970,595

(22) Filed: Dec. 16, 2015

(65) Prior Publication Data
US 2017/0180679 A1    Jun. 22, 2017

(51) Int. Cl.
| | |
|---|---|
| H04N 7/18 | (2006.01) |
| G06T 7/60 | (2017.01) |
| G06T 7/00 | (2017.01) |
| G01M 15/14 | (2006.01) |
| G01B 11/24 | (2006.01) |
| G01B 11/26 | (2006.01) |
| G01B 11/00 | (2006.01) |

(52) U.S. Cl.
CPC .............. *H04N 7/18* (2013.01); *G01B 11/002* (2013.01); *G01B 11/24* (2013.01); *G01B 11/26* (2013.01); *G01M 15/14* (2013.01); *G06T 7/004* (2013.01); *G06T 7/60* (2013.01)

(58) Field of Classification Search
None
See application file for complete search history.

(56) References Cited

U.S. PATENT DOCUMENTS

| | | | |
|---|---|---|---|
| 4,528,856 | A | 7/1985 | Junker et al. |
| 4,746,858 | A | 5/1988 | Metala et al. |
| 4,782,705 | A | 11/1988 | Hoffmann et al. |
| 4,859,062 | A | 8/1989 | Thurn et al. |
| 5,280,179 | A | 1/1994 | Pryor et al. |
| 6,078,396 | A | 6/2000 | Manzouri |
| 6,175,644 | B1 | 1/2001 | Scola et al. |

(Continued)

FOREIGN PATENT DOCUMENTS

WO    WO 2014/031957    2/2014

OTHER PUBLICATIONS

Extended European Search Report and Opinion issued in connection with corresponding EP Application No. 16204247.7 dated Apr. 4, 2017.

*Primary Examiner* — Reza Aghevli
(74) *Attorney, Agent, or Firm* — Dority & Manning, P.A.

(57) ABSTRACT

Locating systems and methods for components are provided. A component has an exterior surface. A method includes locating a surface feature configured on the exterior surface along an X-axis and a Y-axis by analyzing an image of the component to obtain X-axis data points and Y-axis data points for the surface feature. The method further includes directly measuring the surface feature along a Z-axis to obtain Z-axis data points for the surface feature, wherein the X-axis, the Y-axis and the Z-axis are mutually orthogonal. The method further includes calculating at least two of a pitch value, a roll value or a yaw value for the surface feature.

14 Claims, 7 Drawing Sheets

(56) References Cited

U.S. PATENT DOCUMENTS

| | | |
|---|---|---|
| 6,574,363 B1 | 6/2003 | Classen et al. |
| 6,983,659 B2 | 1/2006 | Soechting et al. |
| 6,986,287 B1 | 1/2006 | Dorfman |
| 7,200,259 B1 | 4/2007 | Gold et al. |
| 7,227,648 B2 | 6/2007 | Weinhold |
| 7,414,732 B2 | 8/2008 | Maidhof et al. |
| 7,441,464 B2 | 10/2008 | Turnbull et al. |
| 7,477,995 B2 | 1/2009 | Hovis et al. |
| 7,490,522 B2 | 2/2009 | Ruehrig et al. |
| 7,533,818 B2 | 5/2009 | Hovis et al. |
| 7,689,003 B2 | 3/2010 | Shannon et al. |
| 7,849,752 B2 | 12/2010 | Gregory et al. |
| 8,245,578 B2 | 8/2012 | Ranson et al. |
| 8,307,715 B2 | 11/2012 | Ranson |
| 8,511,182 B2 | 8/2013 | Bjerge et al. |
| 8,600,147 B2 | 12/2013 | Iliopoulos et al. |
| 8,818,078 B2 | 8/2014 | Telfer et al. |
| 8,903,516 B2 | 12/2014 | Trzcinski et al. |
| 8,994,845 B2 | 3/2015 | Mankowski |
| 9,128,063 B2 | 9/2015 | Dooley |
| 9,200,889 B2 | 12/2015 | Swiergiel et al. |
| 9,207,154 B2 | 12/2015 | Harding et al. |
| 9,311,566 B2 * | 4/2016 | Iliopoulos ............ G06K 9/6232 |
| 9,316,571 B2 | 4/2016 | Müller et al. |
| 9,557,164 B2 | 1/2017 | Burnside et al. |
| 9,618,334 B2 | 4/2017 | Burnside et al. |
| 2006/0200017 A1 * | 9/2006 | Monfre .................. A61B 5/061 |
| | | 600/344 |
| 2007/0067140 A1 * | 3/2007 | Jain ........................ B82Y 35/00 |
| | | 702/172 |
| 2013/0013224 A1 * | 1/2013 | Ito ........................... G01B 11/16 |
| | | 702/42 |
| 2013/0194567 A1 | 8/2013 | Wan et al. |
| 2013/0202182 A1 | 8/2013 | Rowe |
| 2013/0202192 A1 * | 8/2013 | Telfer ..................... F03D 17/00 |
| | | 382/154 |
| 2014/0000380 A1 | 1/2014 | Slowik et al. |
| 2014/0267677 A1 * | 9/2014 | Ward, Jr. ........... G02B 23/2484 |
| | | 348/82 |
| 2015/0211851 A1 | 7/2015 | Bridges et al. |
| 2015/0239043 A1 * | 8/2015 | Shipper, Jr. ............. B22D 46/00 |
| | | 415/208.1 |
| 2016/0161242 A1 | 6/2016 | Cook et al. |
| 2016/0313114 A1 * | 10/2016 | Tohme ................. G01B 11/005 |
| 2016/0354174 A1 | 12/2016 | Demir |

\* cited by examiner

LOCATING SYSTEMS AND METHODS FOR COMPONENTS

FIELD OF THE INVENTION

The present disclosure relates generally to locating systems and method for components, and more particularly to systems and methods which facilitate improved locating and subsequent operations on the components, such as positioning of data acquisition systems relative to the components.

BACKGROUND OF THE INVENTION

Throughout various applications, consistent and accurate locating of components and surface features on the components is generally desired. Locating of the components and surface features thereon can facilitate subsequent operations performed on or to the components and surface features.

One application wherein consistent and accurate locating is desired is in applications wherein components are subjected to numerous extreme conditions (e.g., high temperatures, high pressures, large stress loads, etc.). Over time, an apparatus's individual components may suffer creep and/or deformation that may reduce the component's usable life. Such concerns might apply, for instance, to some turbomachines, such as gas turbine systems. During operation of a turbomachine, various components (collectively known as turbine components) within the turbomachine and particularly within the turbine section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, components such as turbine components may be monitored for creep. One approach to monitoring components for creep is to configure strain sensors on the components, and analyze the strain sensors at various intervals to monitor for deformations associated with creep strain. One drawback to such approaches is that apparatus for analyzing the strain sensors must be located in particular positions relative to the strain sensors during each analysis of the strain sensors to prevent any error from being introduced into the deformation analysis due to inconsistencies in such locating. This positioning can be time-consuming and costly, thus resulting in inefficiencies in the deformation monitoring process.

The need for consistent and accurate locating of components and surface features thereon is not limited to stain sensor and turbine component applications. Such need exists in other component applications. For example, accurate and consistent detection of cooling holes defined in the exterior surface of a component is desired, such as for masking purposes. Further, accurate and consistent detection of residual coating layers that are applied to the exterior surface of a component is desired, such as for removal purposes.

Accordingly, alternative locating systems and methods for components which facilitate improved locating and subsequent operations, such as positioning of data acquisition systems relative to the components are desired. In particular, systems and methods which provide efficient and accurate detection of surface features, such as strain sensors, cooling holes, coating layers, etc., would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a locating method for a component is provided. The component has an exterior surface. The method includes locating a surface feature configured on the exterior surface along an X-axis and a Y-axis by analyzing an image of the component to obtain X-axis data points and Y-axis data points for the surface feature. The method further includes directly measuring the surface feature along a Z-axis to obtain Z-axis data points for the surface feature, wherein the X-axis, the Y-axis and the Z-axis are mutually orthogonal. The method further includes calculating at least two of a pitch value, a roll value or a yaw value for the surface feature.

In accordance with another embodiment of the present disclosure, a locating method for a component is provided. The component has an exterior surface. The method includes locating a surface feature configured on the exterior surface along an X-axis and a Y-axis by performing a pixel analysis of an image of the component to obtain X-axis data points and Y-axis data points for the surface feature. The method further includes directly measuring the surface feature along a Z-axis to obtain Z-axis data points for the surface feature, wherein the X-axis, the Y-axis and the Z-axis are mutually orthogonal. The method further includes calculating a pitch value and a roll value for the surface feature based on the X-axis data points, the Y-axis data points and the Z-axis data points.

In accordance with another embodiment of the present disclosure, a locating system for a component is provided. The component has an exterior surface. The system includes a data acquisition system, the data acquisition system including an imaging device for obtaining an image of the component and a three-dimensional data acquisition device for examining a surface feature configured on the exterior surface of the component. The system further includes a processor in operable communication with the data acquisition system. The processor is configured for locating the surface feature along an X-axis and a Y-axis by analyzing the image to obtain X-axis data points and Y-axis data points for the surface feature, obtaining Z-axis data points along a Z-axis for the surface feature based on signals from the three-dimensional data acquisition device, wherein the X-axis, the Y-axis and the Z-axis are mutually orthogonal, and calculating at least two of a pitch value, a roll value or a yaw value for the surface feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
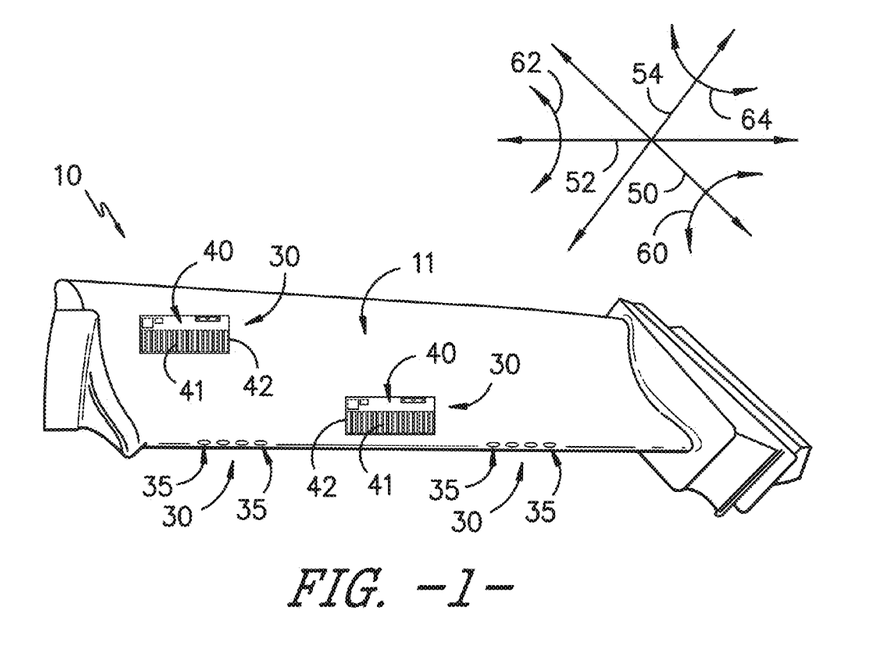
FIG. 1 is a perspective view of an exemplary component comprising surface features in accordance with one or more embodiments of the present disclosure.

Referring now to FIG. 1, a component 10 is illustrated with plurality of surface features 30, in this embodiment strain sensors 40 and/or cooling holes 35, configured thereon. The component 10 (and more specifically the substrate of the overall component 10) can comprise a variety of types of components used in a variety of different applications, such as, for example, components utilized in high temperature applications (e.g., components comprising nickel or cobalt based superalloys). In some embodiments, the component 10 may comprise an industrial gas turbine or steam turbine component such as a combustion component or hot gas path component. In some embodiments, the component 10 may comprise a turbine blade, compressor blade, vane, nozzle, shroud, rotor, transition piece or casing. In other embodiments, the component 10 may comprise any other component of a turbine such as any other component for a gas turbine, steam turbine or the like. In some embodiments, the component may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

The component 10 has an exterior surface 11 on or beneath which strain sensors 40 may be configured. Strain sensors 40 in accordance with the present disclosure may be configured on the exterior surface 11 using any suitable techniques, including deposition techniques; other suitable additive manufacturing techniques; subtractive techniques such as laser ablation, engraving, machining, etc.; appearance-change techniques such as annealing, direct surface discoloration, or techniques to cause local changes in reflectivity; mounting of previously formed strain sensors 40 using suitable mounting apparatus or techniques such as adhering, welding, brazing, etc.; or identifying pre-existing characteristics of the exterior surface 11 that can function as the components of a strain sensor 40. Additionally, in further alternative embodiments, strain sensors 40 can be configured beneath exterior surface 11 using suitable embedding techniques during or after manufacturing of the component 10.

Figure 2:
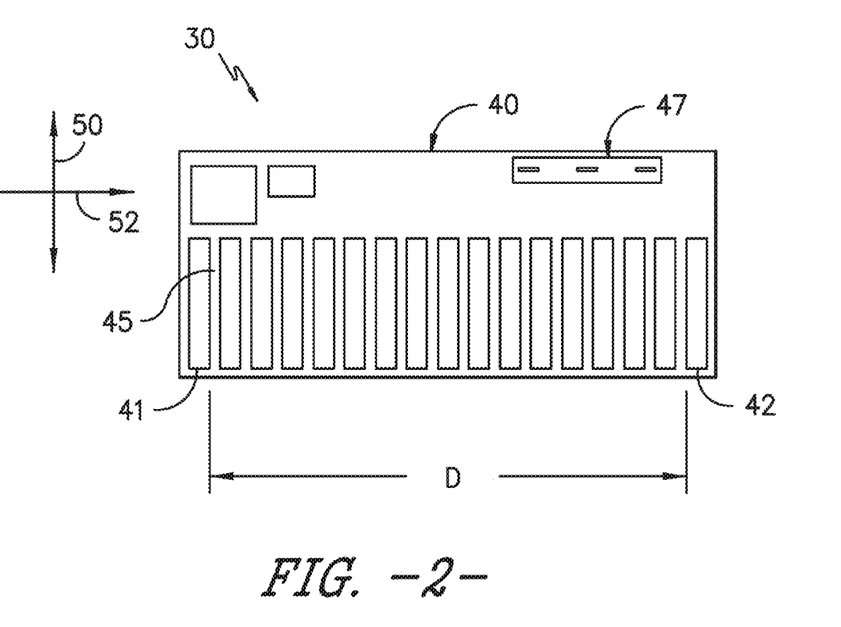
FIG. 2 is a top view of an exemplary surface feature in accordance with one or more embodiments of the present disclosure.

Referring now to FIGS. 1 and 2, a strain sensor 40 generally comprises at least two reference points 41 and 42 that can be used to measure a distance D between said at least two reference points 41 and 42 at a plurality of time intervals. As should be appreciated to those skilled in the art, these measurements can help determine the amount of strain, strain rate, creep, fatigue, stress, etc. at that region of the component 10. The at least two reference points 41 and 42 can be disposed at a variety of distances and in a variety of locations depending on the specific component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The strain sensor 40 may comprise a variety of different configurations and cross-sections such as by incorporating a variety of differently shaped, sized, and positioned reference points 41 and 42. For example, as illustrated in FIG. 2, the strain sensor 40 may comprise a variety of different reference points comprising various shapes and sizes. Such embodiments may provide for a greater variety of distance measurements D such as between the outer most reference points (as illustrated), between two internal or external reference points, or any combination there between. The greater variety may further provide a more robust strain analysis on a particular portion of the component 10 by providing strain measurements across a greater variety of locations.

Furthermore, the values of various dimensions of the strain sensor 40 may depend on, for example, the component 10, the location of the strain sensor 40, the targeted precision of the measurement, application technique, and optical measurement technique. For example, in some embodiments, the strain sensor 40 may comprise a length and width ranging from less than 1 millimeter to greater than 300 millimeters. Moreover, the strain sensor 40 may comprise any thickness that is suitable for application and subsequent optical identification without significantly impacting the performance of the underlying component 10. Notably, this thickness may be a positive thickness away from the surface 11 (such as when additive techniques are utilized) or a negative thickness into the surface 11 (such as when subtractive techniques are utilized). For example, in some embodiments, the strain sensor 40 may comprise a thickness of less than from about 0.01 millimeters to greater than 1 millimeter. In some embodiments, the strain sensor 40 may have a substantially uniform thickness. Such embodiments may help facilitate more accurate measurements for subsequent strain calculations between the first and second reference points 41 and 42.

In some embodiments, the strain sensor 40 may comprise a positively applied square or rectangle wherein the first and second reference points 41 and 42 comprise two opposing sides of said square or rectangle. In other embodiments, the strain sensor 40 may comprise at least two applied reference points 41 and 42 separated by a negative space 45 (i.e., an area in which the strain sensor material is not applied). The negative space 45 may comprise, for example, an exposed portion of the exterior surface 11 of the component 10. Alternatively or additionally, the negative space 45 may comprise a subsequently applied visually contrasting material that is distinct from the material of the at least two reference points 41 and 42 (or vice versa).

As illustrated in FIG. 2, in some embodiments, the strain sensor 40 may include a unique identifier 47 (hereinafter "UID"). The UID 47 may comprise any type of barcode, label, tag, serial number, pattern or other identifying system that facilitates the identification of that particular strain sensor 40. In some embodiments, the UID 47 may additionally or alternatively comprise information about the component 10 or the overall assembly that the strain sensor 40 is configured on. The UID 47 may thereby assist in the identification and tracking of particular strain sensors 40, components 10 or even overall assemblies to help correlate measurements for past, present and future operational tracking.

The strain sensor 40 may thereby be configured in one or more of a variety of locations of various components 10. For example, as discussed above, the strain sensor 40 may be configured on a blade, vane, nozzle, shroud, rotor, transition piece or casing. In such embodiments, the strain sensor 40 may be configured in one or more locations known to experience various forces during unit operation such as on or proximate airfoils, platforms, tips or any other suitable location. Moreover, the strain sensor 40 may be configured in one or more locations known to experience elevated temperatures. For example, the strain sensor 40 may be configured on a hot gas path or combustion turbine component 10.

As discussed herein and as shown in FIG. 1, multiple strain sensors 40 may be configured on a single component 10 or on multiple components 10. For example, a plurality of strain sensors 40 may be configured on a single component 10 (e.g., a turbine blade) at various locations such that the strain may be determined at a greater number of locations about the individual component 10. Alternatively or additionally, a plurality of like components 10 (e.g., a plurality of turbine blades) may each have a strain sensor 40 configured in a standard location so that the amount of strain experienced by each specific component 10 may be compared to other like components 10. In even some embodiments, multiple different components 10 of the same assembly (e.g., blades and vanes for the same turbine in turbine component embodiments) may each have a strain sensor 40 configured thereon so that the amount of strain experienced at different locations within the overall assembly may be determined.

It should be understood that the present disclosure is not limited to strain sensors 40 as illustrated herein. Rather, any suitable surface feature 30 configured on a component 10, such as on the exterior surface 11 thereof, is within the scope and spirit of the present disclosure. Examples of other suitable surface features 30 include cooling holes 35 defined in the exterior surface, coating layers applied to the exterior surface 11 (wherein the exterior surface 11 is defined as that of a base component of the component 10), etc.

A coordinate system is additionally illustrated in FIGS. 1 and 2. The coordinate system includes an X-axis 50, a Y-axis 52, and a Z-axis 54, all of which are mutually orthogonal to each other. Additionally, a roll angle 60 (about the X-axis 50), a pitch angle 62 (about the Y-axis 52) and a yaw angle 64 (about the Z-axis 54) are illustrated.

Figure 3:
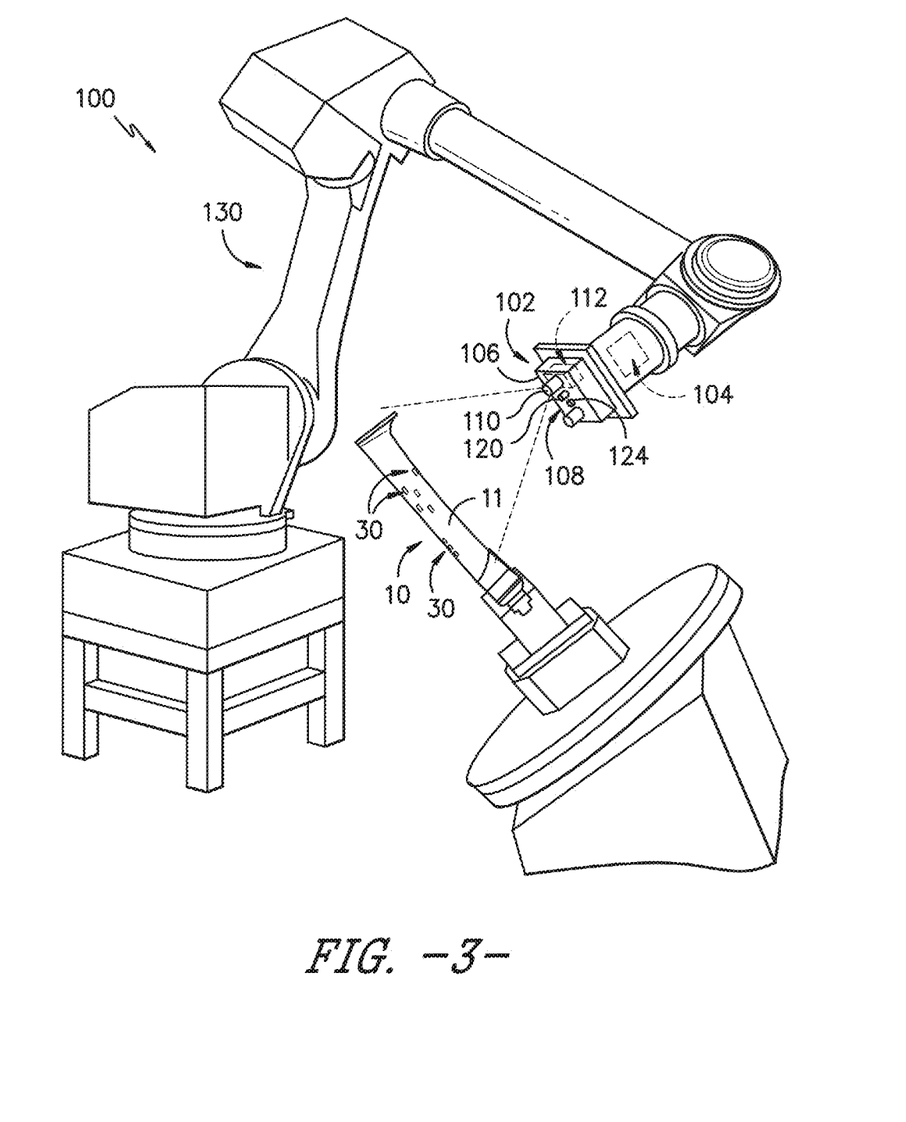
FIG. 3 is a perspective view of a system for monitoring a component during locating of a surface feature in accordance with one or more embodiments of the present disclosure.
Figure 6:
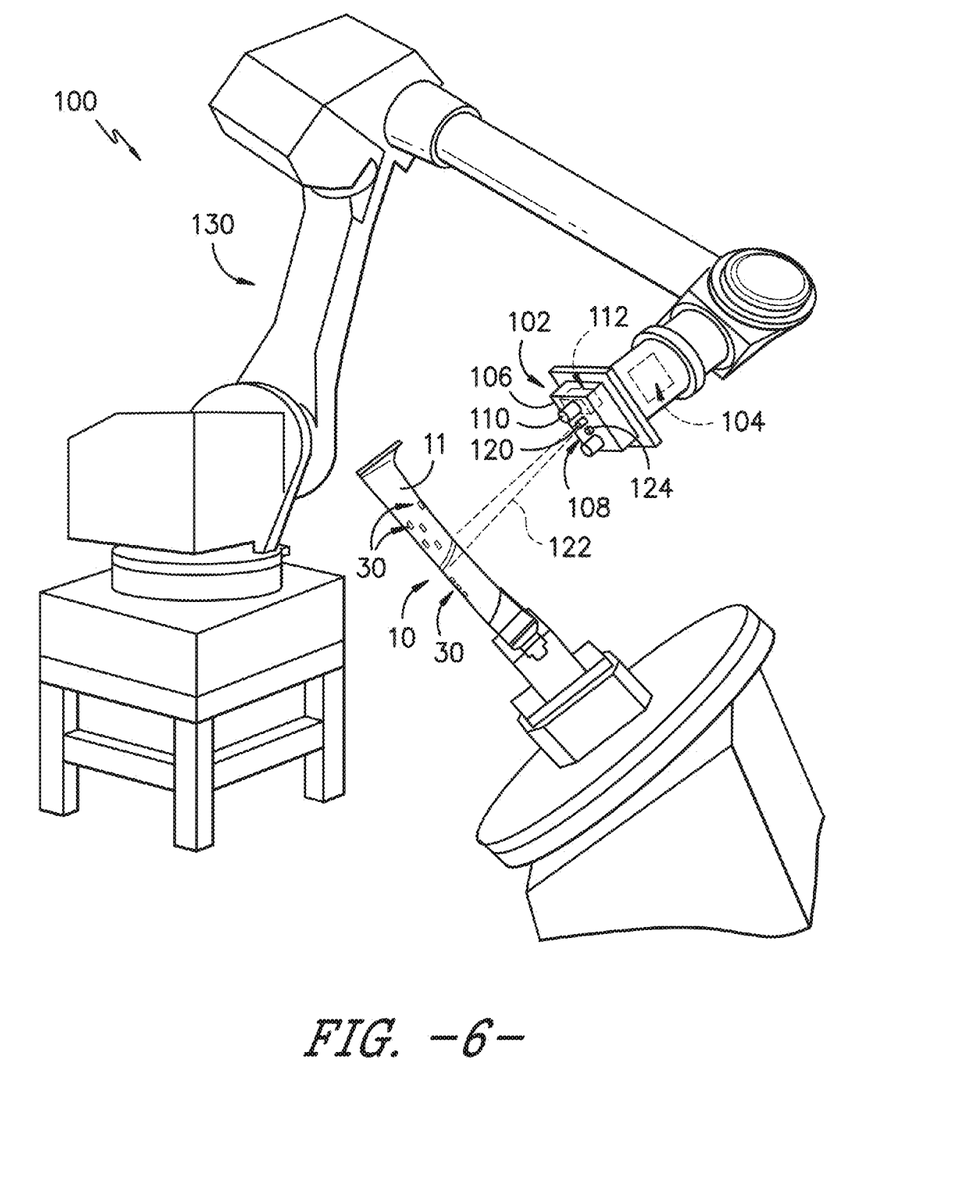
FIG. 6 is a perspective view of a system for monitoring a component during direct measuring of the surface feature in accordance with one or more embodiments of the present disclosure.

Referring now to FIGS. 3 and 6, a locating system 100 for a component 10 is illustrated. System 100 may include, for example, one or more surface features 30 which are configurable on the exterior surface 11 of one or more components 10 as discussed above. System 100 further includes a data acquisition system 102 and a processor 104. The data acquisition system 102 generally acquires data regarding the component 10 and surface feature(s) 30, and the processor 104 generally analyzes the data and performs various calculations and other functions as discussed herein. In particular, systems 100 in accordance with the present disclosure provide accurate and efficient detection of the surface features 30 relative to the component 10.

Such detection facilitates improved operations on or relative to the component 10, such as for example, positioning of the data acquisition system 100 relative to the component 10 and surface features 30 for further monitoring and analysis, such as for deformation monitoring, and/or positioning of other apparatus relative to the component 10 and surface features 30 for further processing of the surface features 30 and component 10. Alternatively, such detection may facilitate other operations on or relative to the component 10. For example, other suitable operations that may be performed may include masking and/or opening of surface features 30, such as cooling holes 35; blending of the component 10 and/or surface features 30 thereof; polishing of the component 10 and/or surface features 30 thereof; welding of the component 10 and/or surface features 30 thereof, etc.

Data acquisition system 102 may include an imaging device 106 for obtaining an image of the component 10. For example, imaging device 106 may include a lens assembly 110 and an image capture device 112. Lens assembly 110 may generally magnify images viewed by the lens assembly 110 for processing by the image capture device 112. Lens assembly 110 in some embodiments may, for example, be a suitable camera lens, telescope lens, etc., and may include one or more lens spaced apart to provide the required magnification. Image capture device 112 may generally be in communication with the lens assembly 110 for receiving and processing light from the lens assembly 110 to generate images. In exemplary embodiments, for example, image capture device 112 may be a camera sensor which receives and processes light from a camera lens to generate images, such as digital images, as is generally understood. Image capture device 112 (and device 106 generally) may further be in communication with processor 104, via for example a suitable wired or wireless connection, for storing and analyzing the images from the image capture device 112 and device 106 generally. Notably, in exemplary embodiments processor 104 performs and operates imaging devices 106 to perform various disclosed steps.

Data acquisition system 102 may additionally include a three-dimensional data acquisition device 108 for examining surface features 30 configured on the exterior surface 11 of the component 10. Devices 108 in accordance with the present disclosure generally utilize surface metrology techniques to obtain direct measurements of the component 10 along three axes. In particular, non-contact surface metrology techniques may be utilized in exemplary embodiments. In general, any suitable three-dimensional data acquisition device 108 which utilizes surface metrology techniques to obtain direct measurements in three dimensions may be utilized. In exemplary embodiments, device 108 is a non-contact device which utilizes non-contact surface metrology techniques.

In accordance with one embodiment as illustrated in FIGS. 3 and 6, device 108 in some exemplary embodiments is a laser scanner. Laser scanners generally include lasers 120 which emit light 122 in the form of laser beams towards objects, such as in these embodiments components 10 generally. The light 122 is then detected by a sensor 124 of the device 108. For example, in some embodiments, the light 122 is then reflected off of surfaces which it contacts, and received by a sensor 124 of the device 108. The round-trip time for the light 122 to reach the sensor 124 is utilized to determine measurements along the various axes. These devices are typically known as time-of-flight devices. In other embodiments, the sensor 124 detects the light 122 on the surface which it contacts, and determines measurements based on the relative location of the light 122 in the field-of-view of the sensor 124. These devices are typically known as triangulation devices. X-axis, Y-axis and Z-axis data points are then calculated based on the detected light, as mentioned. Notably, in exemplary embodiments processor 104 performs and operates such data acquisition devices 108 to perform various disclosed steps.

In some embodiments, the light 122 emitted by a laser 120 is emitted in a band which is only wide enough to reflect off a portion of object to be measured. In these embodiments, robotic arm (as discussed herein) or other suitable mechanism for moving the laser 120 may be utilized to move the laser 120 and the emitted band as required until light 122 has been reflected off of the entire object to be measured.

In other embodiments, the device 108 may for example be a structured light scanner which emits blue light or white light. When the light contacts the component 10, the surface contour of the component 10 distorts the light. This distortion is captured in an image taken by a camera. The image of the light contacting the component 10 is received by, for example, the processor 104. Processor 104 then calculates X-axis data points, Y-axis data points, and Z-axis data points based on the received images by, for example, comparing the distortions in the light pattern to the expected pattern. In other alternative embodiments, other suitable surface metrology devices may be utilized. Notably, in exemplary embodiments processor 104 performs and operates such devices to perform the various required steps.

As discussed, system 100 may further include a processor 104. In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Processor 104 may also include various input/output channels for receiving inputs from and sending control signals to various other components with which the processor 104 is in communication, such as the imaging device 106, data acquisition device 108, robotic arm (discussed herein), etc. Processor 104 may generally perform various steps as discussed herein. Further, it should be understood that a processor 104 in accordance with the present disclosure may be a single master processor 104 in communication with the other various components of system 100, and/or may include a plurality of individual component processors, i.e. an imaging device processor, a data acquisition device processor, a robotic arm processor, etc. The various individual component processors may be in communication with each other and may further be in communication with a master processor, and these components may collectively be referred to as processor 104.

As further illustrated in FIGS. 3 and 6, system 100 may include a robotic arm 130. The robotic arm 130 may support and facilitate movement of other components system 100, such as components of the data acquisition system 102 and the processor 104. For example, the imaging device 106 and data acquisition device 108 may be mounted to the robotic arm 130. Processor 104 may be in communication with the robotic arm 130, such as with the various motors and/or drive components thereof, and may actuate the robotic arm 130 to move as required. Such movement may, in exemplary embodiments, position the data acquisition system 102 relative to the component 10. In exemplary embodiments, the robotic arm 130 is a six-degree-of-freedom arm 130 which provides movement along axes 50, 52, 54 and along angles 60, 62, 64 (about the axes as discussed).

Figure 8:
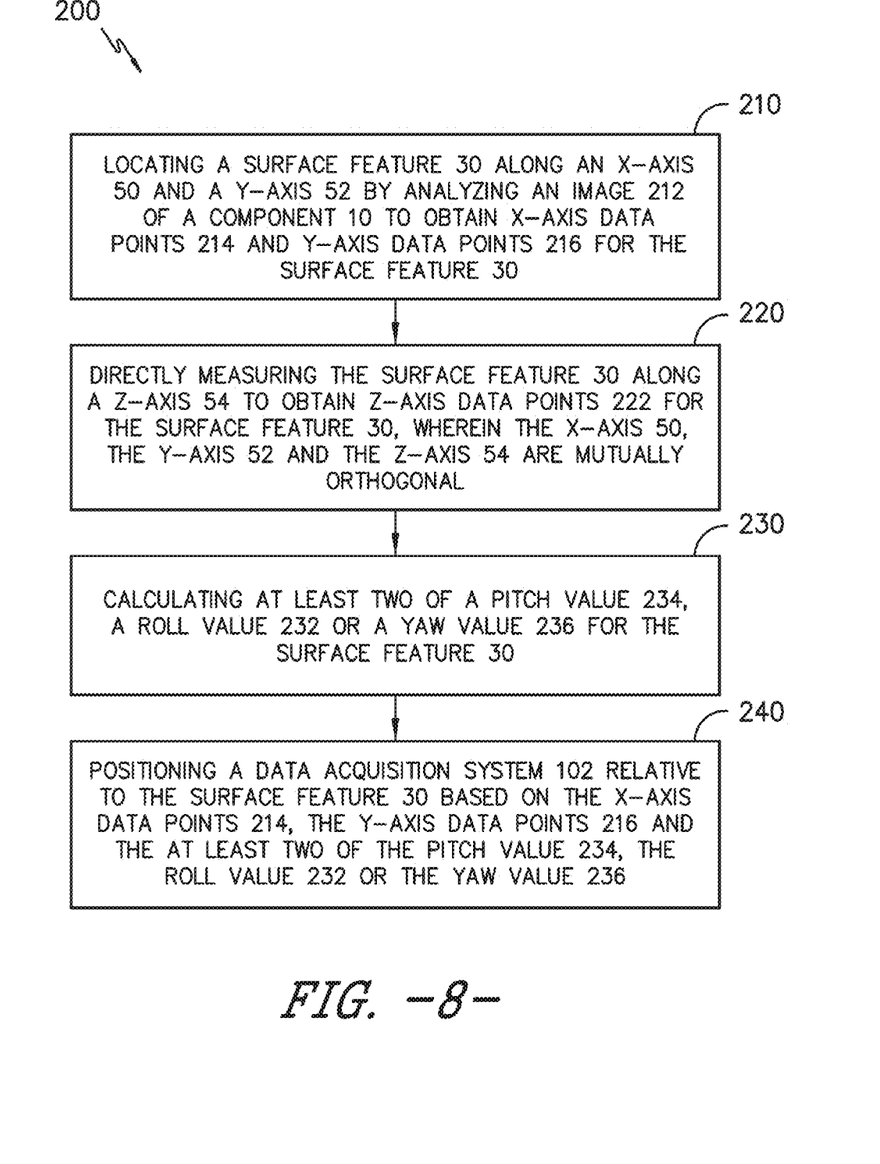
FIG. 8 is a flow chart illustrating a method in accordance with one or more embodiments of the present disclosure.

Referring now to FIG. 8, the present disclosure is further directed to locating methods 200 for components 10. Similar to systems 100, methods 200 may be utilized to accurately and efficiently detect surface features 30, as discussed above. Further, methods 200 can be utilized to position a data acquisition device 102 or other suitable apparatus relative to the component 10, as discussed above. In exemplary embodiments, processor 104 may be utilized to perform various of the method steps 200 discussed herein. Accordingly, systems 100 and methods 200 may be configured for operation as discussed herein.

Figure 4:
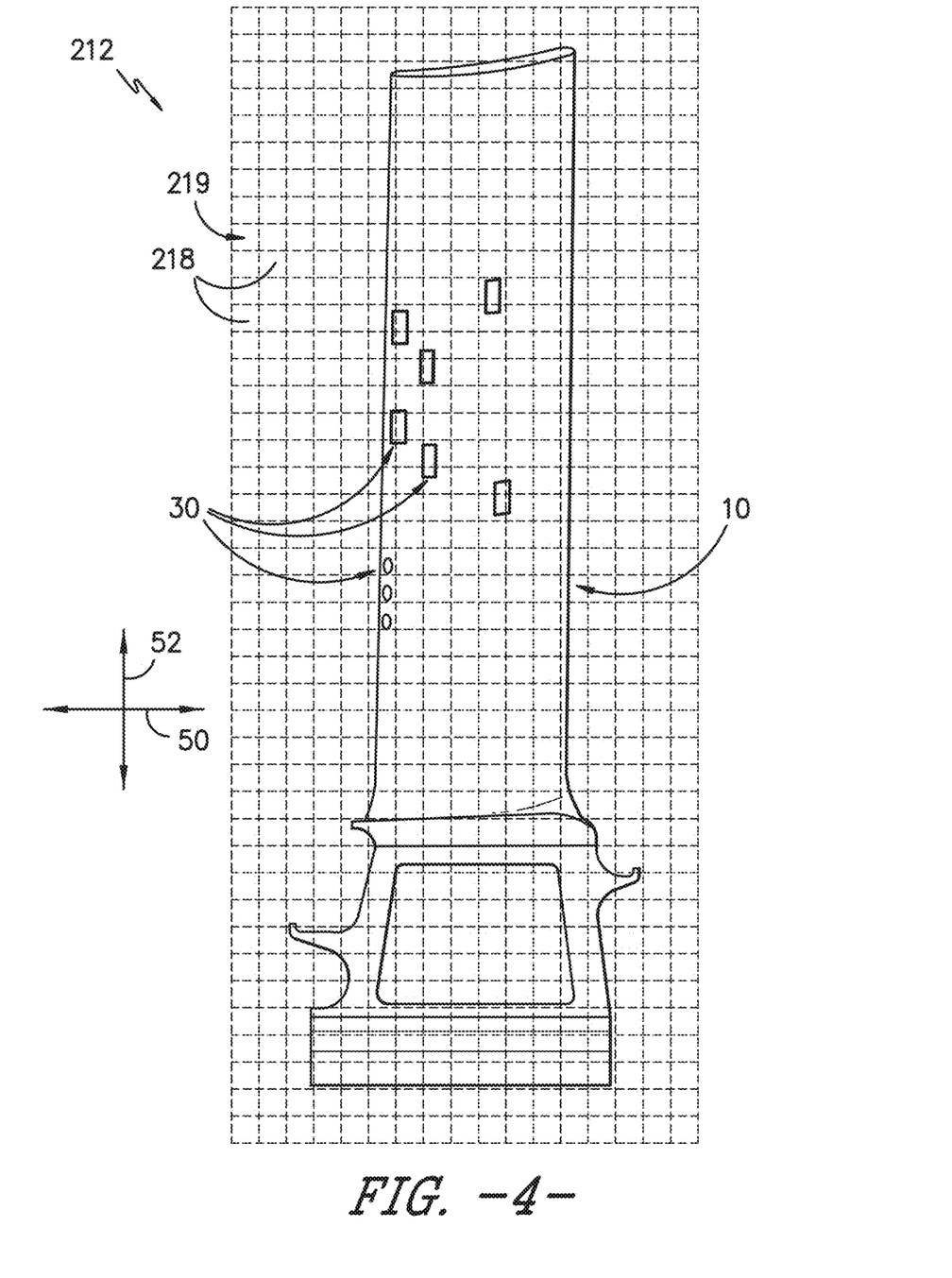
FIG. 4 is an image of a component in accordance with one or more embodiments of the present disclosure.
Figure 5:
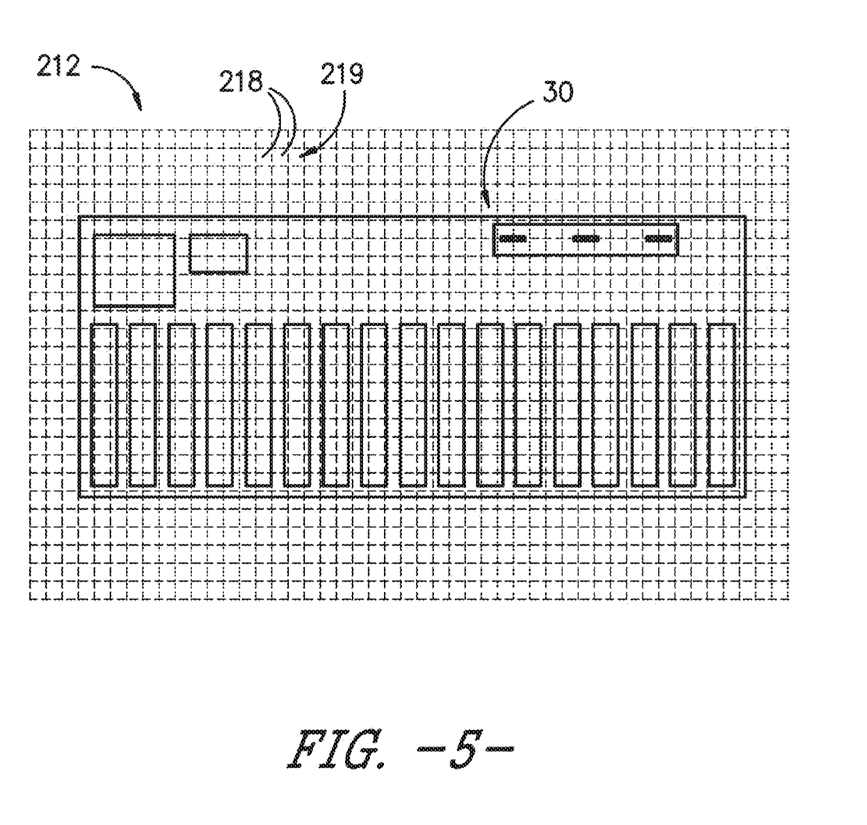
FIG. 5 is a close-up view of a portion of the image of FIG. 4.

Method 200 may include, for example, the step 210 of locating one or more surface features 30 configured on the exterior surface 11 of a component 10 along an X-axis 50 and a Y-axis 52 by analyzing an image 212 of the component 10 to obtain X-axis data points 214 and Y-axis data points 216 for the surface feature 30. FIG. 4 illustrates one embodiment of an image 212 of a component 10, which may for example be obtained via imaging device 106 as discussed herein. FIG. 5 provides a close-up portion of the image 212, illustrating a surface feature 30 on the component 10. The surface features 30 may be located using any suitable image analysis methods, and in exemplary embodiments any suitable two-dimensional image analysis methods which output X-axis data points 214 and Y-axis data points 216. Notably, X-axis data points 214 and Y-axis data points 216 may be obtained for the component 10 itself (relative to, for example, a background in the image 212) and for the surface features 30 relative to the component 10. Such data points 214, 216 may locate the surface features 30 in two-dimensional space relative to the component 10, and may further provide a profile of the component 10 itself (including an outer profile thereof) in two-dimensional space.

In exemplary embodiments, the locating step 210 includes performing a pixel analysis of the image 212. This analysis is generally an analysis which differentiates a reference object (for example, surface features and the component, respectively) from a background (for example, the component and background, respectively) on the basis of differences in color depth (i.e. differences in color or in greyscale). The analysis may be performed on each individual pixel 218 or groups of pixels 219 defining the image 212. For a pixel analysis to occur, the number of bits-per-pixel of the image i.e. 128, 256, etc., may for example be divided into two or more groups (for example a group which includes the lighter color depths and a group which includes the darker color depths). Each group is categorized as a reference object portion or a background portion. For example, the color depth analysis may categorize pixels or multi-pixel groups that are darker or lighter color depths as denoting a reference object (i.e. a surface feature relative to the component, or the component relative to a background), and may categorize pixels or multi-pixel groups that are the other of darker or lighter color depths as denoting a background (i.e. the component relative to a surface feature, or a background relative to the component). Notably, different divisions in the lighter and darker groups may be utilized to distinguish surface features from the component, and the component from a background.

Figure 7:
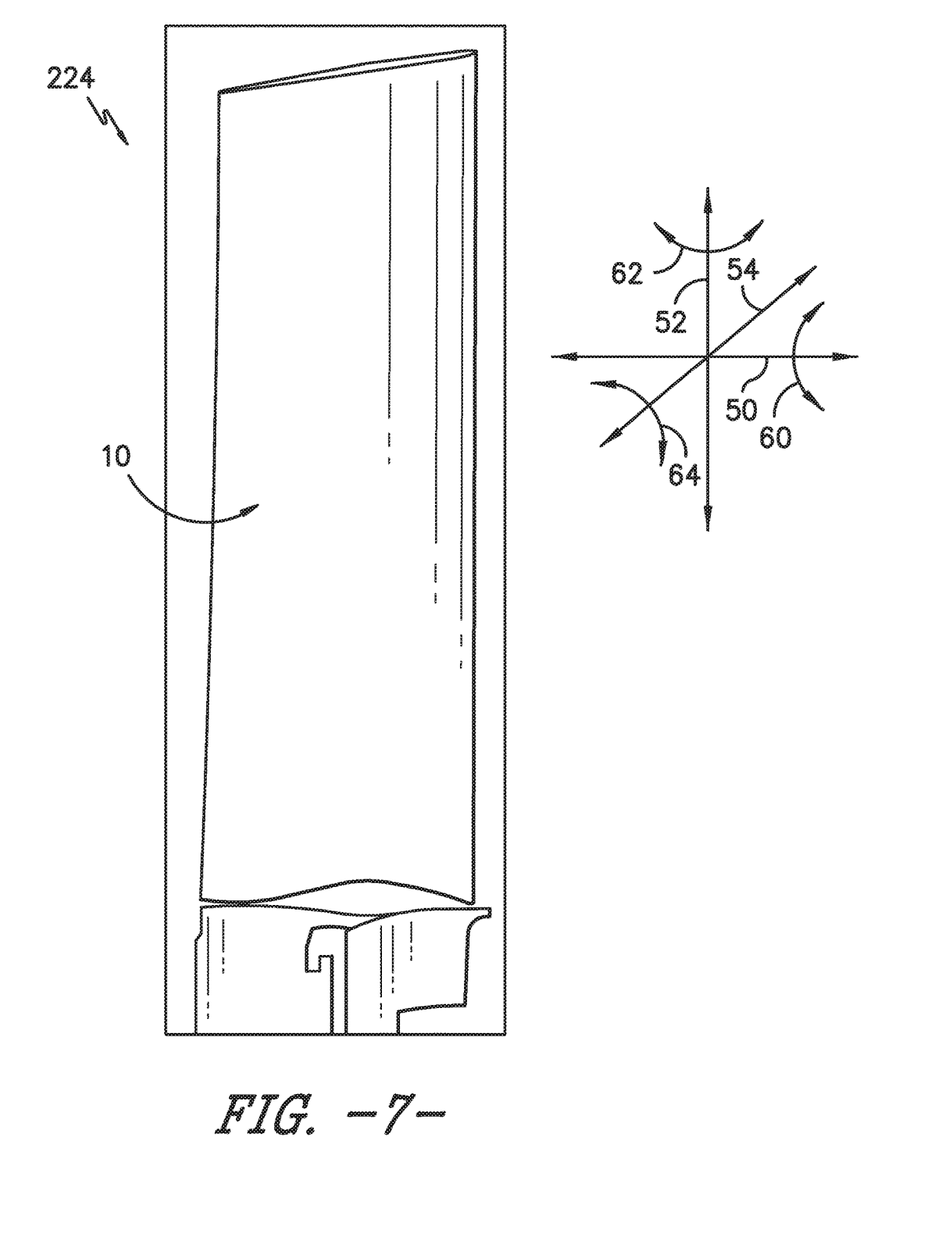
FIG. 7 is a three dimensional profile of the component in accordance with one or more embodiments of the present disclosure.

Accordingly, X-axis data points 214 and Y-axis data points 216 may be obtained for surface features 30 relative to the component 10 (as well as, if desired, for the component 10 itself, such as for an outer profile thereof). A method in accordance with the present disclosure may further include, for example, the step 220 of directly measuring the surface feature(s) 30 along Z-axis 54 to obtain Z-axis data points 222 for the surface feature(s) 30 (and component 10 generally). Notably, step 220 may in exemplary embodiments occur separately from step 210. FIG. 7 illustrates one embodiment of a three-dimensional profile 224 of component 10 that has been directly measured, such as by a three-dimensional data acquisition device 108 as discussed herein.

In particular exemplary embodiments wherein a laser scanner is utilized as discussed herein, step 220 may include for example, the steps of emitting light from a laser towards the surface feature 30 (and component 10 generally), detecting the light after the light is reflected, and calculating the Z-axis data points 222 based on the detected light, as discussed herein. Alternatively, other suitable surface metrology techniques may be utilized, as discussed herein.

Notably, step 220 may further include directly measuring the surface feature(s) 30 along Z-axis 50 and Y-axis 52 to obtain X-axis data points 214 and Y-axis data points 216 for the surface feature(s) 30 (and component 10 generally). In some embodiments, the surface feature(s) 30 may have sufficiently different Z-axis data points from the component 30 that they may be visible in a resulting three-dimensional profile 224 and otherwise detectable relative to the component 10. However, in other embodiments (as shown), the surface feature(s) 30 themselves may only have minimal or no differences from the component 10 itself along the Z-axis, such that the surface feature(s) 30 may not be detectable relative to the component 10 based solely on the data points that result from the directly measuring step 220. Method 200 may thus combine the data points that result from step 210 and step 220 to obtain an overall accurate profile of the component 10 and surface features 30, thus facilitating accurate and efficient surface feature 30 locating.

For example, the X-axis data points 214 and Y-axis data points 216 for the outer profile of the component 10 may be utilized to combine the data sets obtained from steps 210 and 220. In other words, the data sets may be "overlaid" on each other based on the obtained X-axis data points 214 and Y-axis data points 216. Once the data sets have been so combined, X-axis data points 214 and Y-axis data points 216 for each surface feature 30 are known from step 210, and Z-axis data points 222 for each surface feature 30 (i.e. of the component 10 at the location of the surface feature 30 if the surface feature 30 is not independently detectable) are known from step 220. With the data sets combined a full three-dimensional data set is available for each surface feature 30.

A method 200 may further include the step 230 of calculating one, two or more of a roll value 232, a pitch value 234, or a yaw value 236 for one or more of the surface features 30. A roll value 232 may be the specific roll angle 60 at which the surface feature 30 is disposed (relative to a predefined zero angle within the predefined coordinate system). A pitch value 234 may be the specific pitch angle 62 at which the surface feature 30 is disposed (relative to a predefined zero angle within the predefined coordinate system). A yaw value 236 may be the specific yaw angle 64 at which the surface feature 30 is disposed (relative to a predefined zero angle within the predefined coordinate system). In exemplary embodiments, the roll value 232, pitch value 234 and/or yaw value may be average values for the surface feature 30.

The values 232, 234 may, for example, be calculated on the Z-axis data points 222 and one or both of the X-axis data points 214 and Y-axis data points 216. For example, the roll value 232 may be calculated based on the Y-axis data points 216 and the Z-axis data points 222 (and may further utilize the X-axis data points 214) for the surface feature 30. The pitch value 234 may be calculated based on the X-axis data points 214 and the Z-axis data points 222 (and may further utilize the Y-axis data points 216) for the surface feature 30. The yaw value may be calculated based on the Y-axis data points 216 and the X-axis data points 214 (and may further utilize the Z-axis data points 222) for the surface feature 30. Notably, averages of the data points 214, 216, 222 may be utilized to obtain average roll, pitch and yaw values.

In some embodiments, method 200 may further include, for example, the step 240 of positioning data acquisition system 100 relative to a surface feature 30. Such step 240 may facilitate further monitoring and analysis of the surface feature 30 as required. For example, in embodiments wherein the surface feature 30 is a strain sensor 40, such step 240 may facilitate deformation analysis. In some embodiments, for example, the arm 130 may move into a suitable position relative to a surface feature 30. Such positioning may, for example, be based on the X-axis data points 214, Y-axis data points 216 and, optionally, the Z-axis data points 222. For example, the system 100 may be moved into a suitable position relative to a center point of the X-axis data points 214 and the Y-axis data points 216 for a surface feature 30, and may optionally be moved into a suitable position spaced from the surface feature 30 based on the Z-axis data points 222. Such positioning may further be based on one or both of the roll value 232 and pitch value 234, and optionally the yaw value. For example, the system 100 may be moved into a suitable position relative to these values such that features of the system 100 are normal to an average position of the surface feature 30 (based on the values).

In some embodiments, method 200 may further include, for example, the step of masking and/or opening surface features 30, blending, polishing welding, etc. as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A locating method for a component, the component having an exterior surface, the method comprising:
    locating a surface feature configured on the exterior surface along an X-axis and a Y-axis by analyzing an image of the component to obtain X-axis data points for the surface feature relative to the component and Y-axis data points for the surface feature relative to the component;
    directly measuring the surface feature along a Z-axis to obtain Z-axis data points for the surface feature, wherein the X-axis, the Y-axis and the Z-axis are mutually orthogonal;
    calculating a pitch angle for the surface feature based on the X-axis data points for the surface feature relative to the component and the directly measured Z-axis data points; and
    calculating a roll angle for the surface feature based on the Y-axis data points for the surface feature relative to the component and the directly measured Z-axis data points.

2. The method of claim 1, wherein the surface feature is directly measured using a non-contact direct measurement technique.

3. The method of claim 1, wherein the directly measuring step comprises:
    emitting light towards the surface feature;
    detecting the light after the light is reflected; and
    calculating the Z-axis data points based on the detected light.

4. The method of claim 1, wherein analyzing the image comprises performing a pixel analysis of the image.

5. The method of claim 1, further comprising positioning a data acquisition system relative to the surface feature based on the X-axis data points, the Y-axis data points, the pitch angle, and the roll angle.

6. The method of claim 1, wherein the surface feature is a strain sensor.

7. The method of claim 1, wherein the surface feature is a cooling hole.

8. A locating method for a component, the component having an exterior surface, the method comprising:
    locating a surface feature configured on the exterior surface along an X-axis and a Y-axis by performing a pixel analysis of an image of the component to obtain X-axis data points for the surface feature relative to the component and Y-axis data points for the surface feature relative to the component;
    directly measuring the surface feature along a Z-axis to obtain Z-axis data points for the surface feature, wherein the X-axis, the Y-axis and the Z-axis are mutually orthogonal; and
    calculating a pitch angle and a roll angle for the surface feature based on the X-axis data points and the Y-axis data points from the pixel analysis in combination with the directly measured data points.

9. The method of claim 8, further comprising positioning a data acquisition device relative to the surface feature based on the X-axis data points, the Y-axis data points, the pitch angle and the roll angle.

10. A locating system for a component, the component having an exterior surface, the system comprising:
    a data acquisition system, the data acquisition system comprising:
        an imaging device for obtaining an image of the component; and
        a three-dimensional data acquisition device for examining a surface feature configured on the exterior surface of the component; and
    a processor in operable communication with the data acquisition system, the processor configured for:
        locating the surface feature along an X-axis and a Y-axis by analyzing the image to obtain X-axis data points and Y-axis data points for the surface feature;
        obtaining Z-axis data points along a Z-axis for the surface feature based on signals from the three-dimensional data acquisition device, wherein the X-axis, the Y-axis and the Z-axis are mutually orthogonal;
        calculating a pitch angle for the surface feature based on the X-axis data points obtained by analyzing the image and the Z-axis data points obtained from the three-dimensional data acquisition device; and
        calculating a roll angle for the surface feature based on the Y-axis data points obtained by analyzing the image and the Z-axis data points obtained from the three-dimensional data acquisition device.

11. The system of claim 10, wherein the three-dimensional data acquisition device is a non-contact three-dimensional data acquisition device.

12. The system of claim 10, wherein analyzing the image comprises performing a pixel analysis of the image.

13. The system of claim 10, wherein the surface feature is a strain sensor.

14. The system of claim 10, wherein the surface feature is a cooling hole.

* * * * *